United States Patent
Limmer

(10) Patent No.: US 12,393,888 B2
(45) Date of Patent: Aug. 19, 2025

(54) MULTI-OBJECTIVE ELECTRIC VEHICLE CHARGING SCHEDULER WITH CONFIGURABLE OBJECTIVE HIERARCHY

(71) Applicant: Honda Research Institute Europe GmbH, Offenbach/Main (DE)

(72) Inventor: Steffen Limmer, Offenbach (DE)

(73) Assignee: Honda Motor Co., Ltd., Tokyo (JP)

(*) Notice: Subject to any disclaimer, the term of this patent is extended or adjusted under 35 U.S.C. 154(b) by 730 days.

(21) Appl. No.: 17/392,163

(22) Filed: Aug. 2, 2021

(65) Prior Publication Data

US 2022/0327443 A1 Oct. 13, 2022

Related U.S. Application Data

(60) Provisional application No. 63/168,247, filed on Mar. 30, 2021.

(51) Int. Cl.
| | |
|---|---|
| B60L 53/66 | (2019.01) |
| B60L 53/60 | (2019.01) |
| B60L 53/62 | (2019.01) |
| B60L 53/64 | (2019.01) |
| G06Q 10/04 | (2023.01) |
| G06Q 10/0631 | (2023.01) |
| G06Q 50/06 | (2012.01) |

(52) U.S. Cl.
CPC ......... *G06Q 10/0631* (2013.01); *G06Q 10/04* (2013.01); *G06Q 50/06* (2013.01)

(58) Field of Classification Search
CPC .... G06Q 10/0631; G06Q 10/04; G06Q 50/06; G06Q 50/00; B60L 53/66; B60L 53/64; B60L 53/62; B60L 53/60
USPC .......................................................... 701/22
See application file for complete search history.

(56) References Cited

U.S. PATENT DOCUMENTS

| | | | |
|---|---|---|---|
| 8,725,306 B2 | 5/2014 | Ramezani et al. | |
| 10,333,307 B2* | 6/2019 | Hooshmand | G06N 20/00 |
| 10,737,577 B2* | 8/2020 | Kapadia | B60L 53/665 |
| 10,882,411 B2* | 1/2021 | Yang | B60L 58/13 |
| 11,537,091 B2* | 12/2022 | Goverde | G05F 1/66 |
| 11,715,559 B2* | 8/2023 | Naik | G06Q 50/00 |
| | | | 705/2 |
| 2008/0281663 A1* | 11/2008 | Hakim | H02J 3/466 |
| | | | 705/7.25 |
| 2010/0179704 A1* | 7/2010 | Ozog | H02J 7/35 |
| | | | 703/2 |
| 2011/0016063 A1* | 1/2011 | Pollack | B60L 58/12 |
| | | | 320/155 |

(Continued)

OTHER PUBLICATIONS

Dimitrios Letsios et al., Exact Lexicographic Scheduling and Approximate Rescheduling, Aug. 28, 2020 arXiv, pp. 1-48 (pdf).*

(Continued)

*Primary Examiner* — Manglesh M Patel
(74) *Attorney, Agent, or Firm* — JCIPRNET

(57) ABSTRACT

The present invention relates to a method for scheduling charging of electric vehicles by an electric vehicle charging system, wherein charging objectives to be considered in generating a charging schedule for one or more charging stations of the charging system are obtained, a hierarchy of the charging objectives is determined and the charging schedule is generated by performing a lexicographic optimization based on the hierarchy of the charging objectives.

12 Claims, 4 Drawing Sheets

(56) References Cited

U.S. PATENT DOCUMENTS

| | | | | |
|---|---|---|---|---|
| 2011/0140656 A1* | 6/2011 | Starr | | B60L 53/65 320/109 |
| 2011/0227531 A1* | 9/2011 | Rajakaruna | | B60L 53/65 320/109 |
| 2011/0231028 A1* | 9/2011 | Ozog | | H02J 3/14 700/291 |
| 2011/0320828 A1* | 12/2011 | Boss | | H02J 3/14 713/300 |
| 2012/0133337 A1* | 5/2012 | Rombouts | | G07F 15/006 320/155 |
| 2012/0253531 A1* | 10/2012 | Tyagi | | B60L 53/14 700/291 |
| 2012/0330494 A1* | 12/2012 | Hendrix | | B60L 53/66 701/29.3 |
| 2013/0024035 A1* | 1/2013 | Ito | | B60L 53/51 700/291 |
| 2013/0184886 A1* | 7/2013 | Pollack | | B60L 53/64 700/291 |
| 2014/0203775 A1* | 7/2014 | Kim | | B60L 53/14 320/109 |
| 2016/0140449 A1* | 5/2016 | Ansari | | G06N 7/02 706/52 |
| 2019/0079473 A1* | 3/2019 | Kumar | | G05B 13/048 |
| 2019/0359065 A1* | 11/2019 | Al-Awami | | B60L 53/67 |
| 2020/0338999 A1* | 10/2020 | Press | | H04W 4/027 |
| 2020/0393260 A1* | 12/2020 | Falck | | G06Q 10/08355 |
| 2021/0118070 A1* | 4/2021 | Taber, Jr. | | G06Q 40/04 |
| 2021/0138928 A1* | 5/2021 | O'Gorman | | B60L 50/50 |
| 2021/0270622 A1* | 9/2021 | Vallur Rajendran | | B60L 58/16 |
| 2021/0284043 A1* | 9/2021 | Wang | | B60L 58/20 |
| 2022/0024338 A1* | 1/2022 | Zhou | | B60L 58/12 |
| 2022/0072975 A1* | 3/2022 | O'Gorman | | B60L 53/00 |
| 2022/0115872 A1* | 4/2022 | Jones | | H02J 3/381 |
| 2022/0358421 A1* | 11/2022 | Oetsch | | G06F 9/5022 |
| 2022/0410750 A1* | 12/2022 | Mangal | | B60L 53/62 |
| 2023/0011773 A1* | 1/2023 | Kannan | | G06Q 50/06 |
| 2023/0373336 A1* | 11/2023 | Malisani | | B60L 53/66 |
| 2023/0406130 A1* | 12/2023 | Budiscak | | B60L 53/66 |
| 2023/0417561 A1* | 12/2023 | Dandl | | G06Q 10/0631 |
| 2024/0132046 A1* | 4/2024 | Busse | | B60L 53/62 |
| 2024/0300364 A1* | 9/2024 | Wieghardt | | B60L 53/64 |
| 2024/0343149 A1* | 10/2024 | Galbraith | | G06Q 50/06 |
| 2025/0135936 A1* | 5/2025 | Limmer | | B60L 53/64 |
| 2025/0173800 A1* | 5/2025 | Yousefi'zadeh | | G05B 13/024 |

OTHER PUBLICATIONS

Angelo Oddi et al., Energy-aware Multiple State Machine Scheduling for Multi-objective Optimization, Nov. 9, 2018, Advances in Artificial Intelligence. AI*IA, pp. 1-13 (pdf).*

O Sassi et al., Electric Vehicle Scheduling and Optimal Charging Problem: Complexity, Exact and Heuristic Approaches, Nov. 2014, Hal Open science, pp. 1-27 (pdf).*

Tao Liu et al., Battery-electric transit vehicle scheduling with optimal number of stationary chargers, Feb. 2020 Elsevier, pp. 118-139.*

Weitiao Wu et al., Online EV Charge Scheduling Based on Time-of-Use Pricing and Peak Load Minimization: Properties and Efficient Algorithms, 2020 IEEE, pp. 572-586.*

Bo Sun et al., Optimal Scheduling for Electric Vehicle Charging With Discrete Charging Levels in Distribution Grid, 2016, IEEE, vol. 9, No. 2, pp. 624-634.*

Dr. Sheik Mohammed S et al., Optimized Charge Scheduling of Plug-In Electric Vehicles using Modified Placement Algorithm, 2019, IEEE, pp. 1-5 (pdf).*

* cited by examiner

MULTI-OBJECTIVE ELECTRIC VEHICLE CHARGING SCHEDULER WITH CONFIGURABLE OBJECTIVE HIERARCHY

CROSS-REFERENCE TO RELATED APPLICATION

This application claims the priority benefit of provisional application Ser. No. 63/168,247, filed on Mar. 30, 2021. The entirety of the above-mentioned patent application is hereby incorporated by reference herein and made a part of this specification.

TECHNICAL FIELD

This description is directed generally to the charging of electric vehicles, and in particular, to a computer-implemented method, a computer program product, an apparatus and an electric vehicle charging system with which a charging schedule for one or more charging stations is generated.

BACKGROUND

The uncontrolled charging of an increasing number of electric vehicles imposes significant challenges for the stable operation of the power grid. Smart charging allows the control of charging processes in a coordinated way and is seen as an important step towards a successful grid integration of electric vehicles. Furthermore, it can yield benefits to charging station operators and end users (electric vehicle drivers) compared to uncontrolled charging.

A smart charging system controls at least the charging powers at one or multiple charging stations charging batteries of the electric vehicles in order to achieve a certain objective, like minimizing energy cost and/or reducing peaks of electrical load. The component of the smart charging system, which computes charging powers with help of an optimization-based approach, is commonly termed charging scheduler.

Often, it is desired that the charging scheduler takes multiple (at least partly) conflicting objectives into account, like for example, minimizing the peak load, maximizing the number of charged vehicles and minimizing the degradation of the batteries. Since the objectives are conflicting, there is no solution (i.e., charging schedule), which optimizes all objectives together.

The most common approach to deal with this issue is to combine the multiple objectives in form of a weighted sum to one objective function of the optimization problem to be solved as disclosed in U.S. Pat. No. 8,725,306 B2.

However, determining appropriate weights, which have to reflect the preferences in the objectives, is usually difficult. Further, in the context of charging management, it is often desirable to define the preferences in form of a hierarchy of the considered objectives, where an objective at a higher level of the hierarchy has a clearly higher priority than an objective at a lower level of the hierarchy. The weighted-sum approach makes it hard to dynamically adapt the hierarchy to changing preferences since this requires the adjustment of the weights It is desired to overcome the above-mentioned drawbacks and to provide an improved method for scheduling charging of electric vehicles. More specifically, it is desired to provide a computer-implemented method, a computer program product, an apparatus and an electric vehicle charging system with which a charging schedule can be generated with low effort and costs. This is achieved by a method, a program, an apparatus and an electric vehicle charging system according to the enclosed independent claims.

SUMMARY

The present disclosure provides a computer-implemented method, a computer program, a scheduling apparatus and an electric vehicle charging system.

In one general aspect, a computer implemented method for scheduling charging of electric vehicles by an electric vehicle charging system is provided. The method is performed by a processor and comprises the steps of:
  obtaining charging objectives to be considered in generating a charging schedule for one or more charging stations of the charging system;
  determining a hierarchy of the charging objectives; and
  generating the charging schedule by performing a lexicographic optimization based on the hierarchy of the charging objectives.

In another general aspect, a program is provided, wherein the program causes, when running on a computer or loaded onto a computer, the computer to execute the steps of the method described above.

In another general aspect, the scheduling apparatus for scheduling charging of electric vehicles is provided. The scheduling apparatus comprises a processor configured to obtain charging objectives to be considered in generating a charging schedule for one or more charging stations of the charging system, to determine a hierarchy of the charging objectives and to generate the charging schedule by performing a lexicographic optimization based on the hierarchy of the charging objectives.

In another general aspect, an electric vehicle charging system comprising the scheduling apparatus, charging stations for charging electric vehicles and a controlling apparatus for controlling charging stations based on the charging schedule is provided.

The system and/or any of the functions described herein may be implemented using individual hardware circuitry, using software functioning in conjunction with at least one of a programmed microprocessor, a general purpose computer, using an application specific integrated circuit (ASIC) and using one or more digital signal processors (DSPs).

DETAILED DESCRIPTION

Figure 1:
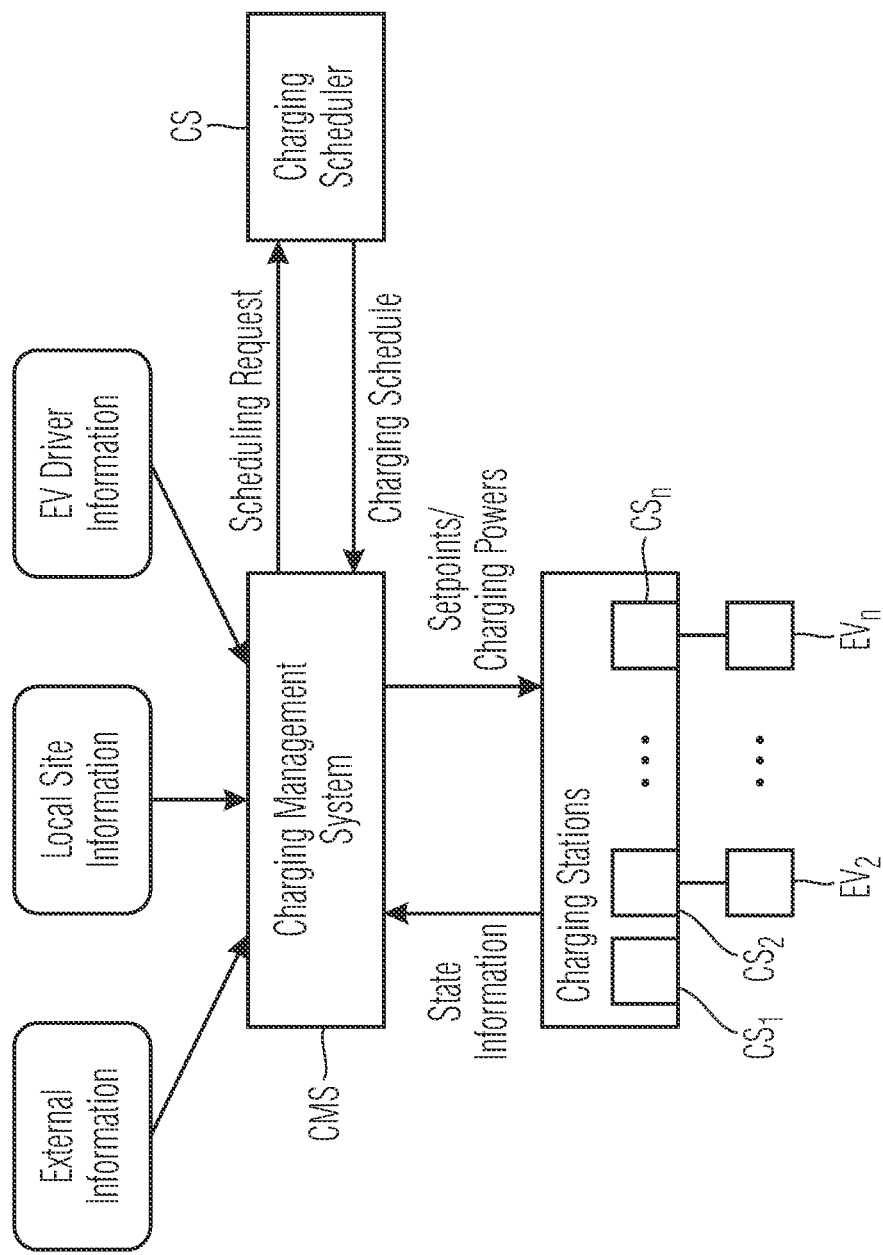
FIG. 1 shows a schematic of the system according to an embodiment of the present disclosure.

With the method for scheduling the charging of electric vehicles, charging objectives to be considered in generating a charging schedule for one or more charging stations of a charging system are obtained from an entirety of base objectives. For example, based on an input of an operator of the charging system a number of charging objectives are specified from the entirety of base objectives. Alternatively, charging objectives can be determined/updated automatically by analyzing or classifying user settings and user behavior and/or by detecting problems of the charging system, e.g., unbalanced utilization of charging stations, low utilization rate (possibly too expensive for the user), high peak load, defective charging stations, high electricity price, excess electricity of own power generation, etc., and by assigning an charging objective to each detected problem based on a table. Then, a hierarchy of the charging objectives is determined and the charging schedule is generated by performing a lexicographic optimization based on the hierarchy of the charging objectives.

With the lexicographic optimization, preferences on the charging objectives that are to be considered are imposed by ordering the objective functions according to their importance or significance, rather than by assigning weights. After the objective functions are arranged by importance, the most important objective is solved first as a single-objective problem, defined as $$\min f_1(x) \tag{1}$$

$$x \in X \tag{2}$$

$y_1^*$ is the optimal solution of the first objective function $f_1(x)$ and X is the set of feasible solutions, defined by different constraints:

$$y_1^* := \min\{f_1(x) | x \in X\} \tag{3}$$

The second objective is then optimized again as a single-objective problem with an added constraint, defined as $$f_1(x) \le y_1^* \tag{4}$$

Thus, according to the hierarchy of charging objectives, the results of the higher priority optimizations form additional constraints for the lower priority single-objective problems solved thereafter. The process is repeated for the remaining objectives/subproblems, wherein, in a step for solving a subproblem M, the optimal solution $y^*_{M-1}$ obtained in the previous step is added as a new constraint as described above. The algorithm terminates after solving the problems according to each charging objective defined in the hierarchy.

The method allows operators to easily configure the hierarchy of objectives considered by the charging scheduler. The hierarchy can even be changed dynamically at runtime. This is hard to realize with the traditional weighted-sum approach since it requires to predefine sets of weights for the different configurations and it is already difficult to determine appropriate weights for only one configuration. Furthermore, if the scheduler should be extended by additional potential objectives, new sets of weights have to be determined. As a solution to this problem, the present method employs lexicographic optimization, which does not rely on weights. In this way, a flexible and easily expandable charging scheduler can be realized.

The charging scheduler can specify, for each charging station, at least one of charging or discharging power, charge current, charge curve and charge amount.

Alternatively or in addition, the charging schedule can be generated or generated again upon request, wherein the request includes at least one of information on the charging objectives and information on their hierarchy.

In the determining step, the hierarchy of the charging objectives can be set in accordance with a preset hierarchy or can be determined by modifying the preset hierarchy based on the information included in the request. This information may be provided by an operator of a charging system The information on the charging objectives can indicate the most frequently desired aspects by users, and the information on the hierarchy can indicate the operator's individual preferences which shall be taken into account for the operator's charging system.

Typically, the lexicographic optimization is more time consuming than the weighted-sum approach and the method can determine whether the configured objective hierarchy can be adapted in order to accelerate the optimization without impact on the optimization results and automatically adapt the hierarchy if applicable. For this purpose, the method can further comprise at least one of the steps:

reducing the number of the charging objectives by determining and removing, from the obtained charging objectives, at least one of a redundant charging objective, a charging objective that is not applicable and a charging objective that is automatically fulfilled, wherein the reduced number of the charging objectives corresponds to the number of optimization problems to be solved in the lexicographic optimization; and reducing the number of the optimization problems by combining at least two charging objectives that are non-conflicting in one common optimization problem.

The scheduling apparatus for scheduling the charging of electric vehicles comprises means for obtaining charging objectives to be considered in generating a charging schedule for one or more charging stations of the charging system, means for determining a hierarchy of the charging objectives and means for generating the charging schedule by performing a lexicographic optimization based on the hierarchy of the charging objectives.

The electric vehicle charging system comprises the scheduling apparatus, charging stations for charging electric vehicles and a controlling apparatus for controlling charging stations based on the charging schedule.

In addition, the controlling apparatus can be configured to transmit, to the scheduling apparatus, a request for generating the charging schedule, wherein the request includes at least one of information on the charging objectives to be considered and information on the hierarchy, and the scheduling apparatus is configured to determine the hierarchy of the charging objectives based on the information included in the request.

In addition, the controlling apparatus can be configured to determine at least one charging objective selected by an operator of the system and to transmit the request including information on the at least one selected charging objective to the scheduling apparatus, which is configured to modify a preset hierarchy of the charging objectives based on the at least one selected charging objective to determine the hierarchy.

Alternatively or in addition, the controlling apparatus can be configured to determine a hierarchy of the charging objectives selected by an operator and to transmit the request including information on the selected hierarchy to the scheduling apparatus, wherein the scheduling apparatus determines the hierarchy in accordance with the selected hierarchy.

The scheduling apparatus and the controlling apparatus according to the disclosure each comprise a processing unit configured to carry out the steps described above. The processing unit can be a controller, a microcontroller, a processor, a microprocessor, an application specific integrated circuit (ASIC), a field-programmable gate-array (FPGA) or any combination thereof.

In the figures, same reference numbers denote same or equivalent structures. The explanation of structures with same reference numbers in different figures is avoided where deemed possible for sake of conciseness.

FIG. 1 shows a block diagram of the electric vehicle charging system. The electric vehicle charging system comprises a plurality of charging stations $CS_1, CS_2, \ldots, CS_N$ for charging batteries of electric vehicles $EV_1, EV_2, \ldots, EV_N$, a charging scheduler CS for generating a charging schedule and a charging management system CMS for controlling the charging stations $CS_1, CS_2, \ldots, CS_N$ based on the charging schedule. The charging scheduler CS (the scheduling apparatus) could be integrated into the charging management system CMS (the controlling apparatus). The charging stations $CS_1, CS_2, \ldots, CS_N$ could be, for example, public charging stations or charging stations at a company site for charging employees' EVs.

The charging management system CMS iteratively sends control signals to the charging stations $CS_1, CS_2, CS_N$ to control at least the respective charging (or discharging) power of the charging station $CS_1, CS_2, \ldots, CS_N$. The charging stations $CS_1, CS_2, \ldots, CS_N$ transmit, for example, information on connection states, maximum and minimum charging powers of the connected electric vehicles $EV_2, \ldots, EV_N$, battery levels of the connected electric vehicles $EV_2, \ldots, EV_N$, etc., to the charging management system CMS. Furthermore, the charging management system CMS might get information from the drivers of connected EVs, like departure time or desired state of charge. All or a part of the charging stations $CS_1, CS_2, \ldots, CS_N$ might be attached to a site with further energy consumers and/or generators, e.g., a company building with a certain base consumption and a photovoltaics system. The charging management system CMS might take into account information from this local site for the charging management. Furthermore, the charging management system CMS receives external information, like electricity prices and driver information, like driver/vehicle ID, desired state of charge, expected time of arrival, desired charging time/power and battery condition (state of charge, temperature).

In order to provide appropriate charging powers, with which a certain objective, like minimizing energy cost or reducing peaks of electrical load is achieved, the charging power to be supplied by each charging station $CS_1, CS_2, \ldots, CS_N$ is planned in advance by the charging scheduler CS with help of the inventive optimization-based approach.

The charging management system CMS sends a scheduling request to the charging scheduler CS, which contains information relevant to compute the charging schedule. The charging scheduler CS then computes a schedule $\vec{P} = [P_{1,1}, \ldots, P_{1,T}, \ldots, P_{N,1}, \ldots, P_{N,T}]$ of charging powers P for the N charging stations $CS_1, CS_2, \ldots, CS_N$ for T time steps of length $\Delta t$ ahead and sends it back to the charging management system CMS. The entry $P_{n,t}$ of the schedule represents the (possibly negative) charging power of a charging station $CS_n$, in time step t. The charging scheduler CS computes a charging schedule taking into account M different objectives $f_1, \ldots, f_M$. Such objectives could be, for example, minimization of electricity cost, maximization of satisfaction of vehicle drivers (this could be further split into multiple objectives if different vehicle drivers can have different priorities), minimizing peak loads, maximizing photovoltaics self-consumption, minimizing battery degradation, maximizing provisioning of grid services and/or minimizing the amount of discharging.

The computation of schedules is done by constructing and solving an optimization problem of the form $$\min_P \{f_1(\vec{P}), \ldots, f_M(\vec{P})\} \tag{5}$$

$$\text{s.t. } \vec{P} \in X, \tag{6}$$

where X is the set of feasible solutions, defined by different constraints. A simple example of such a problem with two objectives is the following:

$$\min f_1 = \Sigma_{n=1}^N \Sigma_{t=1}^T c_t \cdot \Delta t \cdot P_{n,t} \tag{7}$$

$$f_2 = -\Sigma_{n=1}^N E_{n,t} \tag{8}$$

$$\text{s.t. } 0 \leq P_{n,t} \leq P_n^{max} \; \forall n, \forall t \tag{9}$$

$$E_{n,t} = E_n^{init} + \Sigma_{k=1}^t \Delta t \cdot P_{n,k} \; \forall n, \forall t \tag{10}$$

$$0 \leq E_{n,t} \leq C_n \; \forall n, \forall t \tag{11}$$

The first objective function $f_1$ minimizes the electricity cost assuming an electricity price $c_t$ per energy unit in time step t. The second objective function $f_2$ maximizes the sum of the energy levels of the electric vehicles $EV_1, EV_2, \ldots, EV_N$ at the end of the planning horizon. Constraint in (9) ensures that an electric vehicle n (connected to the charging station $CS_n$) cannot charge with a power higher than a certain maximum power $P_n^{max}$ or lower than 0 (i.e., the problem specification does not allow discharging). The constraint in (10) sets the energy levels $E_{n,t}$ of the EVs in each time step t depending on the charging powers and the initial energy levels $E_n^{init}$. The constraint in (n) ensures the technical limitation that the energy charged in a battery of an electric vehicle $EV_1, EV_2, \ldots, EV_N$ neither falls below zero nor exceeds the capacity $C_n$ of the battery. Note, that this exemplary problem description assumes that at each of the N charging stations $CS_1, CS_2, \ldots, CS_N$ an electric vehicle $EV_1, EV_2, EV_N$ is plugged in for the complete planning horizon. In order to solve the problem, variables like N, T, $\Delta t$, $c_t$, for all $t=1, \ldots, T$, $P_n^{max}$ for all $n=1, \ldots, N$, and so on, have to be filled with concrete values. Some of these values (e.g., the number T of time steps to plan ahead) might be configuration parameters of the charging scheduler CS. The remaining values have to be provided by the scheduling request of the charging management system CMS.

In the example problem, the two objectives are conflicting (assuming that the electricity prices $c_t$ are greater zero). This is a common situation. It is assumed that a certain hierarchy of objectives should be considered, where an objective at a higher level of the hierarchy is strictly prioritized over objectives at lower levels of the hierarchy. Without loss of generality, let objective function $f_i$ be at a higher level of the hierarchy than an objective function $f_1$, if i<j. A feasible solution S* of the optimization problem is optimal with respect to a given hierarchy, if it optimizes the objective function $f_1$; at the highest level and if there is no other solution, which improves one of the objectives ($f_i$, i>1) at the lower levels without worsen one of objectives ($f_j$, j<i) at a higher level compared to S*.

Figure 2:
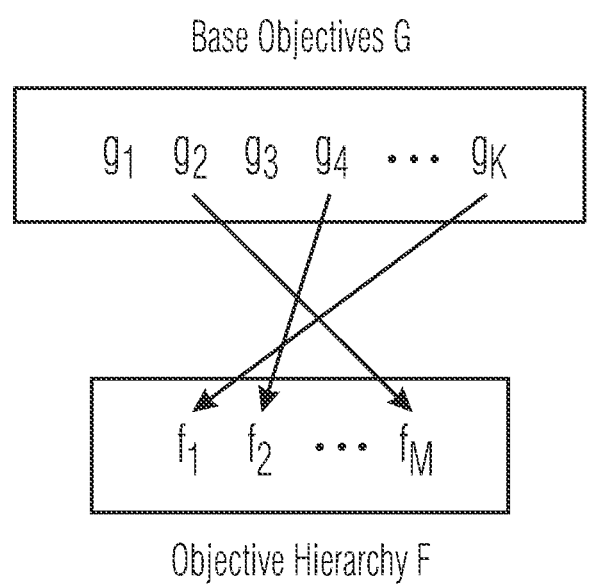
FIG. 2 illustrates mapping of base objectives to an objective hierarchy configuration.

The electric vehicle charging system allows to configure the considered objective hierarchy in order to take different preferences of different operators into account. This is done by providing a set $G=\{g_1, \ldots, g_k\}$ of base objectives and allowing the operator to specify a hierarchy $F=(f_1, \ldots, f_M)$ with $f_i \in G$ for all $i=1, \ldots, M$ and $f_i \neq f_j$ for $i \neq j$ for objectives to be considered in the optimization process. The hierarchy defines the sequence in which for the plurality of charging objectives selected from the entirety of base objectives, the single objective problems shall be solved. This is illustrated in FIG. 2 for a plurality of charging objectives $f_1, f_2, \ldots f_M$ selected from the entirety of base objectives $g_1, g_2, \ldots, g_3, g_K$. Thus, the operator can decide which of the base objectives $g_1, \ldots, g_k$ are considered in the charging scheduling and how the objectives are prioritized against each other. The entirety of base objectives is defined in the design phase of the scheduler. However, since the charging objectives may be selected from the base objectives and ordered by the hierarchy, the invention allows a very flexible adaptation of the scheduling according to the needs of the operator of the system.

Since with the weighted sum approach, this requires to identify appropriate sets of weights for each possible configuration F, which is impractical, lexicographic optimization is used to solve the charging scheduling problem with respect to a given objective hierarchy configuration. So within the limits caused by the available base objectives, and a possible configuration of charging objectives can be addressed with the present invention. With the lexicographic optimization approach, a series of M subproblems is solved, wherein a subproblem is solved first, which only considers the highest prioritized objective function $f$ and the original constraints:

$$\min_P f_1(\vec{P}) \quad (12)$$

$$\text{s.t. } \vec{P} \in X \quad (13)$$

Let $y_1$ be the solution—the optimal objective value—of this subproblem. The second subproblem only considers the second most important objective function $f_2$, and ensures through an additional constraint that the solution is optimal in the sense of the previous subproblem:

$$\min_P f_2(\vec{P}) \quad (14)$$

$$\text{s.t. } \vec{P} \in X \quad (15)$$

$$f_1(\vec{P}) = y_1 \quad (16)$$

Analogously, the solution $y_2$ of the second subproblem is then used to construct a further constraint for the third subproblem, which considers only the objective function $f_3$, and so on, up to the M-th problem considering only objective $f_M$. This approach does not require the specification of weights for the individual objectives for each possible configuration of objectives. Changing the charging objectives selected from the entirety of base objectives and/or objective hierarchy F, only changes the considered objectives and their sequence of solved subproblems. Although, an addition of a new base objective requires redesign of the scheduler, compared to the weighted-sum all approach, this makes it also easy to extend the charging scheduler by providing a further base objective $g_{K+1}$. Contrary to the known approach using weighted sum, no weights for any potential configuration needs to be calculated. Once the schedule is set up with the base objectives, within this boundary flexible optimization routines can be generated based on an input of an operator defining the charging objectives to be used and their hierarchy.

The objective hierarchy to be considered could be set in form of a list in a configuration file by an operator. The configuration file is stored in the charging scheduler CS or transmitted with the request. Furthermore, it would be possible to allow the charging management system CMS to dynamically specify the objective hierarchy to consider it as part of the scheduling request. In addition, the charging management system CMS can automatically adapt the objective hierarchy to changing conditions and/or operator settings, wherein certain setting types or a frequency of these settings is assigned to a certain priority/ranking of an objective (single-objective problem). Alternatively or in addition, the charging management system CMS can continuously estimate one or more conditions, e.g., utilization rate, peak load, number of defective charging stations, electricity price, excess electricity, etc., compare them with a corresponding preset threshold value and increase (or reduce) the priority/ranking of an objective assigned to the condition if the threshold is reached. In this way, with respect to the scheduling problem (7) to (11), if the electricity price falls below a certain value, minimizing the electricity cost can be automatically changed from the most important objective to the second objective and maximizing the sum of the energy levels can be automatically changed from the second objective to the most important objective.

Typically, a higher number of objectives results in a higher runtime since a higher number of subproblems has to be solved. To counter this undesirable effect, it is appropriate to reduce the number of objectives in the hierarchy before the actual optimization, if this does not impact the results of the optimization. For example, if two objectives $f_i$ and $f_{i+1}$ at subsequent levels of the hierarchy are non-conflicting, they could be optimized simultaneously in one common subproblem, which optimizes the sum $f_i + f_{i+1}$, of the objectives and thus the objective hierarchy could be automatically changed to $F = (f_1, \ldots, f_{i-j}, f_i + f_{i+1}, f_{1+2}, \ldots, f_M)$.

Further, if an objective $f_i$ is redundant, since it is already implied by another objective $f_j$, $j < i$, at a higher level of the hierarchy (e.g., the objective of charging EVs as fast as possible typically implies the objective of charging EVs as much as possible), the objective $f_i$ could be automatically removed from the hierarchy. Analogously, if an objective is not applicable or is automatically fulfilled, respectively, due to constraints (e.g., the objective of minimizing discharging is automatically fulfilled if the minimum charging power of all EVs is 0), this objective could be removed from the hierarchy.

Figure 3:
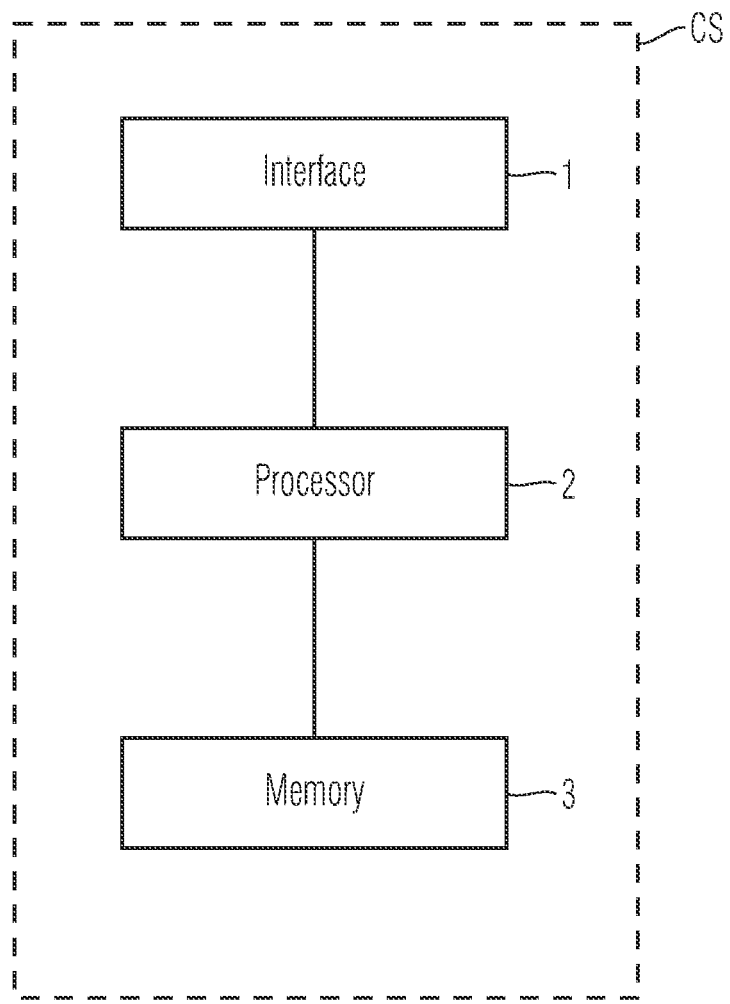
FIG. 3 shows a block diagram of the scheduling apparatus.

FIG. 3 shows a block diagram of the charging scheduler CS. The charging scheduler CS comprises an interface 1, with which the charging scheduler CS is connected to the charging management system CMS, a processor 2 configured to generate the charging schedule and a memory for storing data, e.g., information on the objectives and the hierarchy. The generation of the charging schedule by the processor 2 could be implemented as software in C/C++. To construct and solve the subproblems of the lexicographic optimization according to a configured objective hierarchy, an appropriate solver and its corresponding API (application programming interface) could be used. In the case of only linear objectives and constraints, the SCIP (Solving Constraint Integer Programs) solver disclosed in A. Gleixner, et al.: "The SCIP optimization suite 5.0" Tech. Rep. 17-61, ZIB, Takustr.7, 14195 Berlin, 2017 could be used. The interface 1 from/to the CMS could be realized based on HITP(S) (Hypertext Transfer Protocol (Secure)) and a REST (Representational State Transfer) protocol.

It can be expected that not all operators are able to decide on an objective hierarchy since this requires a fundamental understanding of how different hierarchies affect the scheduling results. Thus, the charging management system CMS or the charging scheduler CS can provide a reasonable default hierarchy in case that a request does not specify charging objectives to be used and their hierarchy. In order to refine the default set of charging objectives to be used from the base objectives and the charging objectives' hierarchy, the configurations chosen by the different operators could be collected on a central server. From this information, a default hierarchy, which is suited for most users/operators, could be derived. This could be, for example, the hierarchy, which is chosen most frequently by the users/operators. Another option could be to define a distance measure on objective hierarchies and to set the default hierarchy to the hierarchy, which minimizes the average distance to the hierarchies chosen by the users/operators.

Figure 4:
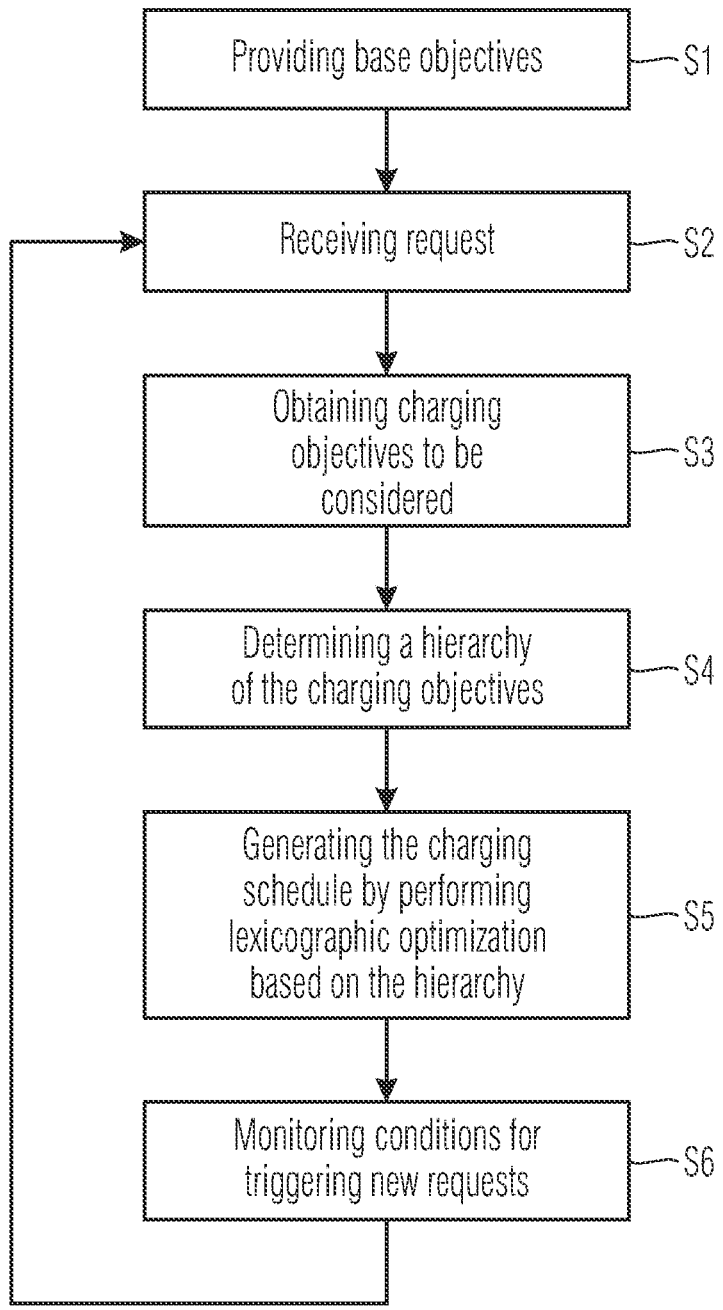
FIG. 4 shows a flowchart of the method according to an embodiment of the present disclosure.

FIG. 4 shows a simplified flowchart of an embodiment of the method according to the present invention. In step S1, the base objectives $g_1, \ldots, g_k$ are provided by the scheduler to the charging management system CMS. The selection of charging objectives $f_1, \ldots F_M$ is performed in step S3, based on a respective definition in a request received in step S2 from the charging management system CMS via the interface 1. In step S4, a charging objective hierarchy for the selected objectives is generated from a configuration or based on the request received from the charging management system CMS. This hierarchy might be adapted by combining and/or deleting charging objectives as explained above. In step S5, the processor 2 generates the charging schedule for a certain time interval by performing a lexicographic optimization as described above. The resulting schedule is transferred to the charging management system CMS and based on this charging schedule the charging stations are operated in step S6. The charging management system CMS monitors in step S7 the current state with respect to conditions triggering that a new request is sent to the scheduler.

The steps S3 to S5 are only executed again, if a (new) request is received from the charging management system CMS. A new request may be sent from the charging management system CMS at the end of the time interval and/or when an efficient change in the state of the charging stations, for example, a changing number of vehicles connected to the charging stations, is recognised. Of course, other conditions which require an adaptation of the charging schedule may be defined causing the charging management system CMS to transmit a request to the scheduler. The hierarchy and/or the charging objectives $f_1, \ldots F_M$ can be automatically adjusted to changing conditions, wherein at least one condition of the charging management system CMS is assigned to a corresponding base objective $g_1, \ldots, g_k$ shown in FIG. 2 and at least one state or change of the condition is assigned to a certain position in the hierarchy $f_1, \ldots,$ or $f_M$ as shown in FIG. 2. The charging management system CMS determines the at least one state/change by continuously evaluating the at least one condition and, when the state/change is determined, adapts the information on the to be selected charging objectives and their position in the hierarchy accordingly, if necessary. Alternatively, a pattern/set of states/changes of one or more conditions can be assigned to a certain hierarchy, which is set when the pattern/set is determined.

The generated charging schedule is used in the domain of electric vehicle charging management, wherein the hierarchy can be easily changed manually or automatically. This allows to make a single charging scheduler or charging scheduling service applicable for a broad range of different users with different preferences and requirements to the charging management. Besides EV charging stations, further energy consumers and/or generators, like stationary batteries, could be considered in the scheduling, making the solution applicable for energy management tasks in general.

It will be apparent to those skilled in the art that various modifications and variations can be made to the structure of the disclosure without departing from the scope or spirit of the disclosure. In view of the foregoing, it is intended that the preset disclosure covers modifications and variations of this disclosure provided they fall within the scope of the following claims and their equivalents.

What is claimed is:

1. A method for charging batteries of electric vehicles, the method comprising the steps of:
    providing, by a scheduling apparatus, base objectives,
    obtaining, from an entirety of the base objectives, by a processor of the scheduling apparatus, charging objectives to be considered in generating a charging schedule for one or more charging stations configured for charging the batteries of the electric vehicles;
    determining, by the processor of the scheduling apparatus, a hierarchy of the charging objectives;
    generating, by the processor of the scheduling apparatus, the charging schedule by performing a lexicographic optimization based on the hierarchy of the charging objectives, wherein the charging objectives include at least one of minimization of electricity cost, minimizing peak loads, maximizing photovoltaics self-consumption, minimizing battery degradation, maximizing provisioning of grid services and minimizing the amount of discharging; and
    charging the batteries of the electric vehicles using the one or more charging stations by controlling and specifying, based on the charging schedule, at least one of charging or discharging power, charge current, charge curve and charge amount for each charging station, wherein the hierarchy is adjusted to changing conditions, wherein at least one condition of a controlling apparatus for controlling the one or more charging stations based on the charging schedule is assigned to the corresponding base objective and at least one state or change of the condition is assigned to a corresponding position in the hierarchy.

2. The method according to claim 1, wherein
    the charging schedule is generated or generated again upon request; and
    the request includes at least one of information on the charging objectives and information on the hierarchy.

3. The method according to claim 2, wherein
    in the determining step, the hierarchy of the charging objectives is set in accordance with a preset hierarchy or is determined by modifying the preset hierarchy based on the information included in the request.

4. The method according to claim 3, wherein
    the information on the charging objectives indicates the most frequently selected charging objectives by users and the information on the hierarchy indicates the most frequently selected hierarchies by the users.

5. The method according to claim 1, further comprising at least one of the steps:
    reducing a number of the charging objectives by determining and removing, from the obtained charging objectives, at least one of a redundant charging objective, a charging objective that is not applicable and a charging objective that is automatically fulfilled, wherein the reduced number of the charging objectives corresponds to a number of optimization problems to be solved in the lexicographic optimization; and reducing the number of the optimization problems by combining at least two charging objectives that have a solution optimizing both the at least two charging objectives into one optimization problem.

6. A program that, when running on a computer or loaded onto a computer, causes the computer to execute the method according to claim 1.

7. An electric vehicle charging system, comprising a scheduling apparatus, charging stations for charging batteries of electric vehicles and a controlling apparatus for controlling charging stations based on the charging schedule, wherein the scheduling apparatus is configured to provide base objectives and, from an entirety of the base objectives, to obtain charging objectives to be considered in generating a charging schedule for one or more charging stations of the electric vehicle charging system, to determine a hierarchy of the charging objectives, and to generate the charging schedule by performing a lexicographic optimization based on the hierarchy of the charging objectives, wherein the charging objectives include at least one of minimization of electricity cost, minimizing peak loads, maximizing photovoltaics self-consumption, minimizing battery degradation, maximizing provisioning of grid services and minimizing the amount of discharging, wherein the controlling apparatus is configured to control the charging stations to charge the batteries of the electric vehicles by controlling and specifying, based on the charging schedule, at least one of charging or discharging power, charge current, charge curve and charge amount for each charging station, and wherein the hierarchy is adjusted to changing conditions, wherein at least one condition of the controlling apparatus is assigned to the corresponding base objective and at least one state or change of the condition is assigned to a corresponding position in the hierarchy.

8. The electric vehicle charging system according to claim 7, wherein the controlling apparatus is configured to transmit, to the scheduling apparatus, a request for generating the charging schedule;

the request includes at least one of information on the charging objectives and information on the hierarchy, and the processor is configured to determine the hierarchy of the charging objectives based on the information included in the request.

9. The electric vehicle charging system according to claim 8, wherein the controlling apparatus is configured to determine at least one charging objective selected by a user and to transmit the request including information on the at least one selected charging objective, and the processor is configured to modify a preset hierarchy of the charging objectives based on the at least one selected charging objective to determine the hierarchy.

10. The electric vehicle charging system according to claim 8, wherein the controlling apparatus is configured to determine a hierarchy of the charging objectives selected by a user and to transmit the request including information on the selected hierarchy, and the processor is configured to determine the hierarchy in accordance with the selected hierarchy.

11. A method for charging batteries of electric vehicles, the method comprising steps of:

obtaining, by a processor of a scheduling apparatus, charging objective to be considered in generating a charging schedule for one or more charging stations configured for charging the batteries of the electric vehicles;

determining, by the processor of the scheduling apparatus, a hierarchy of the charging objectives;

generating, by the processor of the scheduling apparatus, the charging schedule by performing a lexicographic optimization based on the hierarchy of the charging objectives, wherein the charging objectives include at least one of minimization of electricity cost, minimizing peak loads, maximizing photovoltaics self-consumption, minimizing battery degradation, maximizing provisioning of grid services and minimizing an amount of discharging; and charging the batteries of the electric vehicle using the one or more charging stations by controlling and specifying, based on the charging schedule, at least one of charging or discharging power, charge current, charge curve and charge amount for each charging station; and at least one of the steps of:

reducing a number of the charging objectives by determining and removing from the obtained charging objectives, at least one of a redundant charging objective, a charging objective that is not applicable and a charging objective that is automatically fulfilled, wherein the reduced number of the charging objectives corresponds to a number of optimization problems to be solved in the lexicographic optimization; and reducing the number of the optimization problems by combining at least two charging objectives that have a solution optimizing both the at least two charging objectives into one optimization problem.

12. An electric vehicle charging system, comprising a scheduling apparatus, charging stations for charging batteries of electric vehicles and a controlling apparatus for controlling charging stations based on a charging schedule, wherein the scheduling apparatus is configured to obtain charging objectives to be considered in generating a charging schedule for one or more charging stations of the electric vehicle charging system, to determine a hierarchy of the charging objectives, and to generate the charging schedule by performing lexicographic optimization based on the hierarchy of the charging objectives, wherein the charging objectives include at least one of minimization of electricity cost, minimizing peak loads, maximizing photovoltaics self-consumption, minimizing battery degradation, maximizing provisioning of grid services and minimizing an amount of discharging, wherein the controlling apparatus is configured to control the charging stations to charge the batteries of the electric vehicles by controlling and specifying, based on the charging schedule, at least one of charging or discharging power, charge current, charge curve and charge amount for each charging station, wherein the scheduling apparatus is further configured to:

reduce a number of the charging objectives by determining and removing, from the obtained charging objectives, at least one of a redundant charging objective, a charging objective that is not applicable and a charging objective that is automatically fulfilled, wherein the reduced number of the charging objectives corresponds to a number of optimization problems to be solved in the lexicographic optimization; and/or reduce the number of the optimization problems by combining at least two charging objectives that have a solution optimizing both the at least two charging objectives into one optimization problem.

* * * * *